United States Patent

Geyer et al.

[11] 4,009,946
[45] Mar. 1, 1977

[54] IRIS LEAF FOR OPTICAL COMPONENT

[75] Inventors: Hermann Geyer, Lengfeld, Wurzburg; Albert Baab; Paul Himmelsbach, both of Bad Kreuznach, all of Germany

[73] Assignee: Jos. Schneider & Co. Optische Werke Kreuznach, Bad Kreuznach, Germany

[22] Filed: Feb. 21, 1975

[21] Appl. No.: 551,722

[30] Foreign Application Priority Data

Feb. 23, 1974   Germany .......................... 2408793

[52] U.S. Cl. ............................... 350/266; 354/274
[51] Int. Cl.² ........................................ G05D 25/00
[58] Field of Search .................... 350/266; 354/274

[56] References Cited
UNITED STATES PATENTS

| 3,348,463 | 10/1967 | Nerwin | 354/274 |
| 3,727,531 | 4/1973 | Baab | 354/274 |

Primary Examiner—John K. Corbin
Assistant Examiner—Matthew W. Koren
Attorney, Agent, or Firm—Karl F. Ross; Herbert Dubno

[57] ABSTRACT

Iris leaves for optical components such as diaphragms or shutters are injection-molded, together with integral pivot pins, of thermoplastic resin which is given a mat appearance by a roughening of the mold-cavity surfaces. In the case of a composite leaf consisting of two legs articulated to each other, each leg is a curved foil whose cross-section tapers from its convex to its concave edge to facilitate relative swinging of the legs. The mold cavities are duplicated in confronting surfaces of coacting mold halves and open into deeper sprue channels whose junctions with the cavities are formed by converging slots in shearing bolts that are guided in transverse bores encroaching upon the convex cavity edges, a displacement of these shearing bolts by a distance greater than the foil thickness severing the molded leaves from the runners before the mold is opened.

12 Claims, 9 Drawing Figures

IRIS LEAF FOR OPTICAL COMPONENT

FIELD OF THE INVENTION

Our present invention relates to optical components with annular arrays of overlapping iris leaves, such as diaphragms and shutters.

BACKGROUND OF THE INVENTION

Conventionally, iris leaves are made of thin sheet steel by a series of steps including stamping, deburring, pickling and the attachment of hinge pins. Since it is generally desirable to minimize the reflection of light from their surfaces, steels of mat appearance are preferred which, however, are less corrosion-resistant than shiny steels. The riveting of the small hinge pins to the steel foils is laborious and time consuming. Owing to their mode of manufacture, the leaves generally have uniform thickness and sharp edges resulting in considerable wear as the contacting foils swing past one another.

OBJECT OF THE INVENTION

The object of our present invention is to provide an improved iris leaf which obviates the aforestated disadvantages.

SUMMARY OF THE INVENTION

An iris leaf embodying our invention comprises at least one curved foil of thermoplastic material, e.g. a polycarbonate, whose major surfaces are bounded by a concave and a convex edge and which have one or more studs rising integrally from at least one of these surfaces.

In a more elaborate case, a pair of such foils are articulated to each other to form a composite iris leaf.

A foil of this description can be mass produced on an injection-molded machine in a shallow cavity between two separable mold halves, with injection of the thermoplastic material into the cavity at an edge thereof and subsequent severing of a runner from the foil body by shearing off an end of that runner before the mold halves are separated. For this purpose, the mold is provided with one or more shearing bolts which are slidably guided in transverse bores at the junction of the cavity with respective branches of a sprue channel, each guide bore encroaching slightly on the cavity edge to ensure a clean break. The resulting notches in an edge of the foil body are nonobjectionable if they are located on the side of that body remote from the axis of the annular array of iris leaves, i.e. along its convex edge inasmuch as the concave foil edges define the aperture of a diaphragm or a shutter.

With the plastic material injected from the side of the convex foil edge (which, of course, corresponds to a concave edge), rapid filling of the cavity is facilitated if its depth decreases progressively with increasing distance from the sprue channel and consequently from a slot in the shearing bolt through which that channel normally communicates with the cavity. This decrease in depth leads to a progressive reduction in the thickness of the foil body from its convex to its concave edge, which is advantageous since it diminishes the contact between adjacent foils and therefore lessens their wear along their concave, aperture-defining edges. The slot of the shearing bolt may converge from the sprue channel to the cavity which allows that channel to be made substantially deeper than the cavity for easier flow.

The desired mat finish can be imparted to the foil by roughening one or both cavity surfaces by etching, sandblasting or the like.

BRIEF DESCRIPTION OF THE DRAWING

The above and other features of our invention will now be described in detail with reference to the accompanying drawing in which.

SPECIFIC DESCRIPTION

Figure 1:
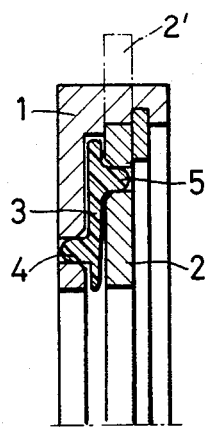
FIG. 1 is a fragmentary cross-sectional view of an optical diaphragm incorporating an array of iris leaves according to our invention.
Figure 2:
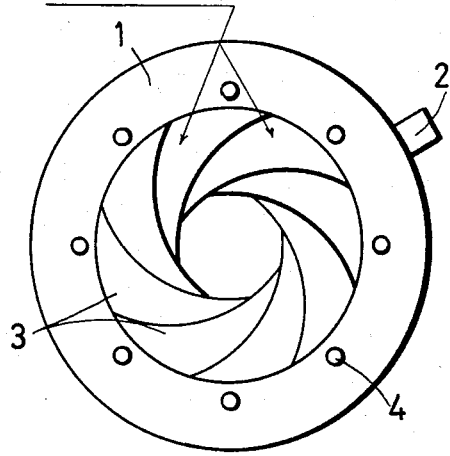
FIg. 2 is a face view of the iris diaphragm of FIG. 1.

In FIGS. 1 and 2 we have shown an iris diaphragm comprising the usual pair of coaxial, relatively rotatable rings, i.e. a mounting ring 1 and a setting ring 2; the latter ring is provided with a handle 2' enabling its rotation. A multiplicity of iris leaves 3 are overlappingly disposed, in an annular array, between the two rings and are fulcrumed to them at spaced-apart locations as is well known per se.

In accordance with our invention, each iris leaf 3 is integrally molded from thermoplastic material and has a foil-shaped body, tapering in cross-section from a convex outer edge to a concave inner edge, with two studs 4 and 5 rising from opposite surfaces thereof, these studs being pivotally received in respective bores of mounting ring 1 and setting ring 2. The position shown in FIG. 2 is one in which the diaphragm aperture is partly closed. As indicated in this Figure, the ribs 3 have a mat finish so as to be substantially nonreflecting.

Figure 3:
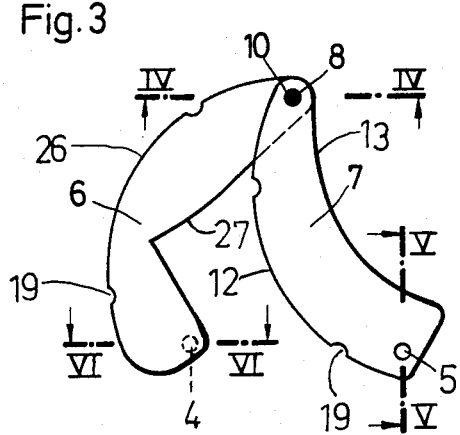
FIG. 3 is a face view of a composite iris leaf according to our invention.
Figure 4:
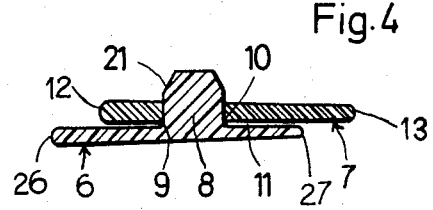
FIGS. 4, 5 and 6 are cross-sectional views taken, respectively, on lines IV — IV, V — V and VI — VI of FIG. 3.

FIGS. 3 – 6 show a composite iris leaf with a pair of articulated legs 6 and 7, each of these legs being a curved foil generally similar to the body of the leaves 3 of FIGS. 1 and 2. The main foil 6 carries the stud 4 engaging the mounting ring 1 whereas the ancillary foil 7 is provided with the stud 5 received in setting ring 2. Another stud 8, also integrally molded with foil 6, enters a hole 10 in foil 7 to form a hinge. As seen in FIG. 4, stud 8 has a tapering free end 21 to facilitate its insertion into the hole 10; it also has a broadened foot with a flared surface 9 of finite radius of curvature engaging a complementarily flared rim of hole 10. This enables the stud 8 to be held in the hole 10 with a slight press fit whose small frictional resistance allows free relative swinging of the two foils which are otherwise held slightly separated by the broadened foot. The intervening clearance 11, exaggerated in the drawing for the sake of clarity, increases toward the concave foil edges 13 and 27 for the reasons discussed above.

Figure 6:
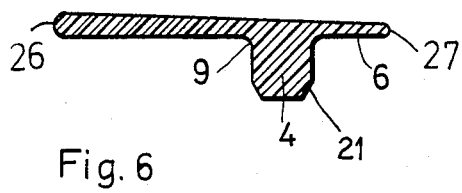
Figure 5:
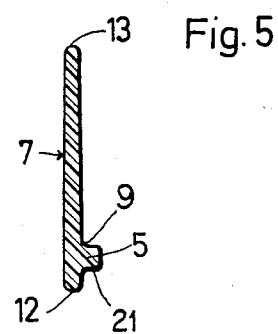

A similar flaring 9 and chamfering 21 can also be observed in FIGS. 5 and 6 on the studs 5 and 4. These studs, accordingly, keep the major foil surfaces slightly spaced from confronting surfaces of adjoining members, i.e. of the mounting and setting rings 1, 2 as shown in FIG. 1.

The convex foil edges 12 and 26 are provided with spaced-apart notches 19 whose significance, already mentioned briefly, will become clearer hereinafter.

Figure 7:
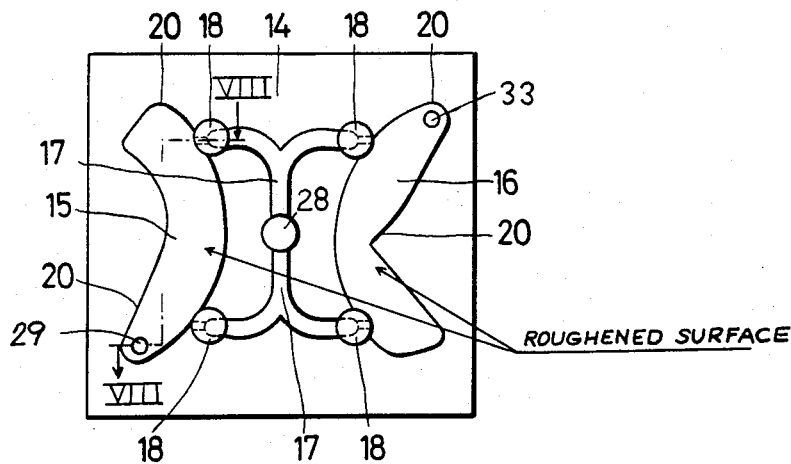
FIG. 7 is a face view of one half of a mold for making a composite iris leaf as shown in FIGS. 3 — 6.
Figure 8:
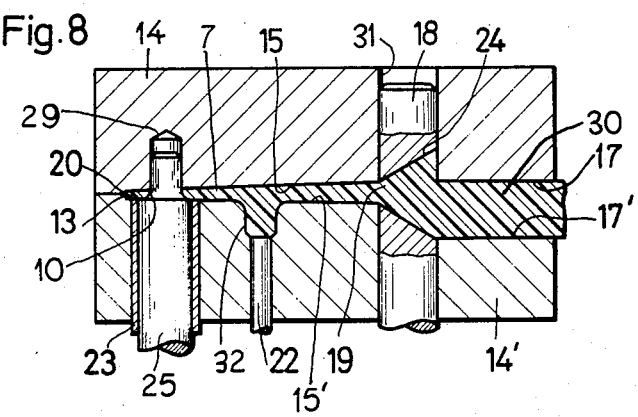
FIG. 8 is a fragmentary cross-sectional view of the mold of FIg. 7 in closed position, taken on the line VIII — VIII of FIG. 7.
Figure 9:
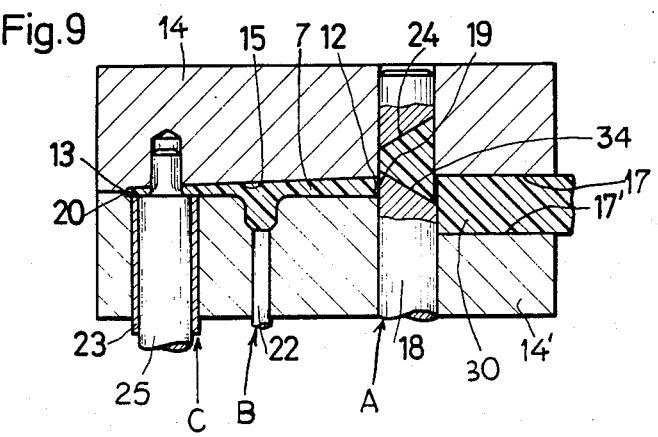
FIG. 9 is a view similar to FIG. 8, showing a molded foil body severed from a runner within the closed mold.

In FIGS. 7 – 9 we have illustrated a mold with two halves 14, 14' whose confronting surfaces are recessed to form a pair of cavities for the simultaneous molding of two foils 6, 7 as shown in FIG. 3. The mold cavity for ancillary foil 7 is defined by a shallow recess 15 in mold half 14 and a complementary, equally shallow recess 15' in mold half 14'; the cavity for main foil 6 is formed in part by a shallow recess 16. Between these two recesses, mold half 14 is provided with an injection gate 28 from which two branches of a sprue channel extend to the proximal cavity edges, the sprue channel being formed by complementary grooves 17, 17' in the surfaces of mold halves 14 and 14'. Transverse bores 31, extending through both mold halves at the junctions of the sprue channel with the cavities, cut across the curved cavity edges and serve for the guidance of respective shearing bolts 18 having generally trapezoidal slots 24 through which injected plastic material is funneled from the sprue channel into the cavities. It will be noted that the depth of channel 17, 17' considerably exceeds that of cavity 15, 15' (this being also true of the other cavity) and that the depth of this cavity progressively decreases from the narrower end of slot 24 so that a converging flow path exists between gate 28 and foil edge 13. The boundaries 20 of all of the cavity-forming recesses have flared rims which allows the foil edges 12, 13 and 26, 27 to be rounded as best seen in FIGS. 4 – 6.

FIGS. 8 and 9 further show the mold half 14' provided with a blind bore 32 for the molding of stud 5 integral with foil 7; similar bores, one of which is shown at 33 in FIg. 7, form the studs 4 and 8 of foil 6. The hole 10 of foil 7 is shaped by a core 25 whose reduced tip is received in a bore 29 of mold half 14 opening onto recess 15.

In operation, with the mold 14, 14' closed and the shearing bolts 18 in a normal retracted position as illustrated in FIG. 8, plastic material is injected into the cavities to form the two foils as well as a runner 30 extending from the sprue channel 17, 17' into the slots 24 of the several bolts. After the foils have hardened, bolts 18 are displaced (arrow A in FIG. 9) by a distance exceeding the maximum foil thickness so that an end 34 of the runner is sheared off and is cleanly severed along notch 19 from the foil body. Next, the mold is opened whereupon a pin 22, terminating at bore 32, and a sleeve 23, surrounding the core 25, are displaced as indicated by arrows B and C in FIG. 9 to eject the foil 7 from recess 15; similar ejection means are of course used in recess 16. The runner 30, if cold, will be ejected at the same time; the plug 34 is seated in slot 24 can be dislodged by suitable means such as an airstream, if necessary. Alternatively, the runner 30 and the plug 34 may be kept warm by nonillustrated heating means, as is well known per se, in which case the sprue channel should be formed in only one of the mold halves so as to remain closed against the outside when these halves are separated.

As indicated in FIG. 7, the bottom surfaces of recesses 15 and 16 have been roughened (by one of the methods mentioned above) to produce the desired mat finish of the foil body.

We claim:

1. An iris leaf for an optical component, comprising at least one curved foil of thermoplastic material with major surfaces bounded by a concave edge and a convex edge and with a stud rising integrally from at least one of said major surfaces, said stud broadening toward the body of the foil for maintaining a clearance between said one of said major surfaces and a confronting surface of an adjoining member articulated thereto by said stud.

2. An iris leaf as defined in claim 1 wherein said foil has a mat finish on at least one major surface.

3. An iris leaf as defined in claim 1 wherein said foil progressively decreases in thickness from said convex edge to said concave edge.

4. An iris leaf as defined in claim 1 wherein said stud has a tapering free end.

5. An iris leaf as defined in claim 1, comprising another curved foil of like material articulated to said one foil.

6. An iris leaf as defined in claim 5 wherein said foils have convex edges facing in the same direction and are provided with notches at said convex edges.

7. An iris leaf for an optical component, comprising a first and a second curved foil of thermoplastic material each having a pair of major surfaces bounded by a concave edge and a convex edge, said first foil being provided at one extremity with one stud rising from one major surface thereof and on the opposite extremity with another stud rising from the other major surface thereof, said second foil overlapping said first foil and being provided at one extremity with a hole receiving said one stud and at the opposite extremity with a further stud rising from the major surface thereof which is farther from said first foil, each of said studs being joined to the body of the respective foil by a broadened foot keeping the major surfaces of said foils separated from one another and from confronting surfaces of adjoining members articulated thereto by said other and further studs.

8. An iris leaf as defined in claim 7 wherein said foot of said one stud is received in a complementarily flared rim of said hole.

9. An iris leaf as defined in claim 7 wherein each of said foils progressively decreases in thickness from said convex edge to said concave edge thereof.

10. An iris leaf as defined in claim 7 wherein, in a region of overlap of said foils, their thicknesses progressively decrease in the same direction.

11. An optical component comprising a pair of coaxial, relatively rotatable rings and an annular array of overlapping iris leaves between said rings, each of said rings being provided with a set of holes, each of said iris leaves comprising a curved foil of thermoplastic material with major surfaces bounded by an inner concave edge and an outer convex edge and with a stud rising integrally from each of said major surfaces, each of said studs being received in a hole of a respective ring, each stud broadening toward the body of the foil for maintaining a clearance between said major surfaces and confronting ring surfaces.

12. An optical component as defined in claim 11 wherein each of said foils progressively decreases in thickness from said convex edge to said concave edge.

* * * * *